US010172276B2

(12) United States Patent
Peterson et al.

(10) Patent No.: US 10,172,276 B2
(45) Date of Patent: Jan. 8, 2019

(54) IMPLEMENT FRAME CONVERTIBLE BETWEEN FIELD AND TRANSPORT POSITIONS

(71) Applicant: Deere & Company, Moline, IL (US)

(72) Inventors: James R. Peterson, Annawan, IL (US); Vaughn Bauer, Paton, IA (US); David Maach, Paton, IA (US); Andrew Paulsen, Ames, IA (US)

(73) Assignee: DEER & COMPANY, Moline, IL (US)

( * ) Notice: Subject to any disclaimer, the term of this patent is extended or adjusted under 35 U.S.C. 154(b) by 70 days.

(21) Appl. No.: 15/184,238

(22) Filed: Jun. 16, 2016

(65) Prior Publication Data
US 2017/0359942 A1 Dec. 21, 2017

(51) Int. Cl.
*A01B 73/00* (2006.01)
*A01B 63/16* (2006.01)
*A01B 63/22* (2006.01)
*A01B 63/32* (2006.01)

(52) U.S. Cl.
CPC .......... *A01B 73/005* (2013.01); *A01B 63/163* (2013.01); *A01B 63/22* (2013.01); *A01B 63/32* (2013.01)

(58) Field of Classification Search
CPC ....... A01B 63/16; A01B 73/00; A01B 73/005; A01B 73/02
USPC .......................................... 172/311, 483, 484
See application file for complete search history.

(56) References Cited

U.S. PATENT DOCUMENTS

| | | | | |
|---|---|---|---|---|
| 4,721,168 A | * | 1/1988 | Kinzenbaw | A01B 73/005 111/57 |
| 6,213,034 B1 | * | 4/2001 | Raducha | A01B 73/005 111/55 |
| 6,321,852 B1 | * | 11/2001 | Pratt | A01B 73/005 111/59 |
| D469,782 S | * | 2/2003 | Paluch | D15/10 |
| 7,849,932 B2 | * | 12/2010 | Friggstad | A01B 69/003 172/278 |
| 7,900,711 B2 | | 3/2011 | Kinzenbaw | |
| 8,342,255 B2 | * | 1/2013 | Connors | A01B 73/00 172/278 |
| 8,534,982 B2 | * | 9/2013 | Meenen | A01D 75/002 414/550 |
| 9,072,214 B2 | * | 7/2015 | Connors | A01B 63/006 |
| 9,533,612 B2 | * | 1/2017 | Meenen | B60P 1/00 |
| 2015/0342111 A1 | * | 12/2015 | Meenen | A01B 73/005 414/550 |

* cited by examiner

*Primary Examiner* — Gary S Hartmann (57) ABSTRACT

An implement frame having a carriage frame for coupling to a towing vehicle and wheels to support the frame for movement over a ground surface. A pivot frame is rotationally mounted to the carriage frame and a lift assembly is coupled to the pivot frame via a shift assembly. A tool bar is mounted to the lift assembly. The shift assembly moves the tool bar forward as it is moved from the field use position to the transport position. The wheels are mounted to swing arms to move the wheels inward for a narrow transport position. All motion is accomplished through actuators, such as hydraulic cylinders, to automate the process making it quick and easy.

9 Claims, 8 Drawing Sheets

IMPLEMENT FRAME CONVERTIBLE BETWEEN FIELD AND TRANSPORT POSITIONS

FIELD

The present disclosure relates to a frame of an implement, such as an implement used for agricultural operations, and in particular to such a frame that is easily and quickly converted from field use to transport positions.

BACKGROUND

To efficiently work the ground in an agricultural operation, whether by tillage, chemical application, seed planting, and the like, it is necessary to have an implement that extends laterally a distance larger than the width of a towing vehicle. To move such an implement between fields or between a field and a storage site, it is necessary to reduce the width for transport. Various types of frames have been developed for such a purpose. These include, among others, forwardly folding frames, upwardly folding frames, lift and fold frames, and lift and pivot frames. A need exists for an implement frame that can quickly and easily between transitioned between field use and transport positions or orientations.

SUMMARY

The implement frame described below includes a carriage frame for coupling to a towing vehicle having wheels to support the frame for movement over a ground surface. A pivot frame is rotationally mounted to the carriage frame and a lift assembly is coupled to the pivot frame via a shift assembly. The tool bar is mounted to the lift assembly. The shift assembly moves the tool bar forward as it is transitioned from the field use position to the transport position. The wheels are mounted on swing arms to move the wheels inward for a narrow transport position. All motion is accomplished through actuators, such as hydraulic cylinders, to automate the process making it quick and easy. This is particularly advantageous for an implement used in a large number of different fields where the implement needs to be transitioned between field use and transport many times within one season.

DETAILED DESCRIPTION

An implement frame 20 is shown and described with reference to the figures. Implement frame 20 includes a carriage frame 22 having a tongue 24 at one end for coupling the frame to a towing vehicle, such as a tractor, not shown. Various types of tongues 24 can be used depending on the user's preference or needs. Left and right wheels 26 and 28 are coupled to the carriage frame 22 by left and right swing arms 30 and 32 respectively. The wheels enable movement of the implement frame over a ground surface in a forward direction shown by the arrow 34.

Figure 1:
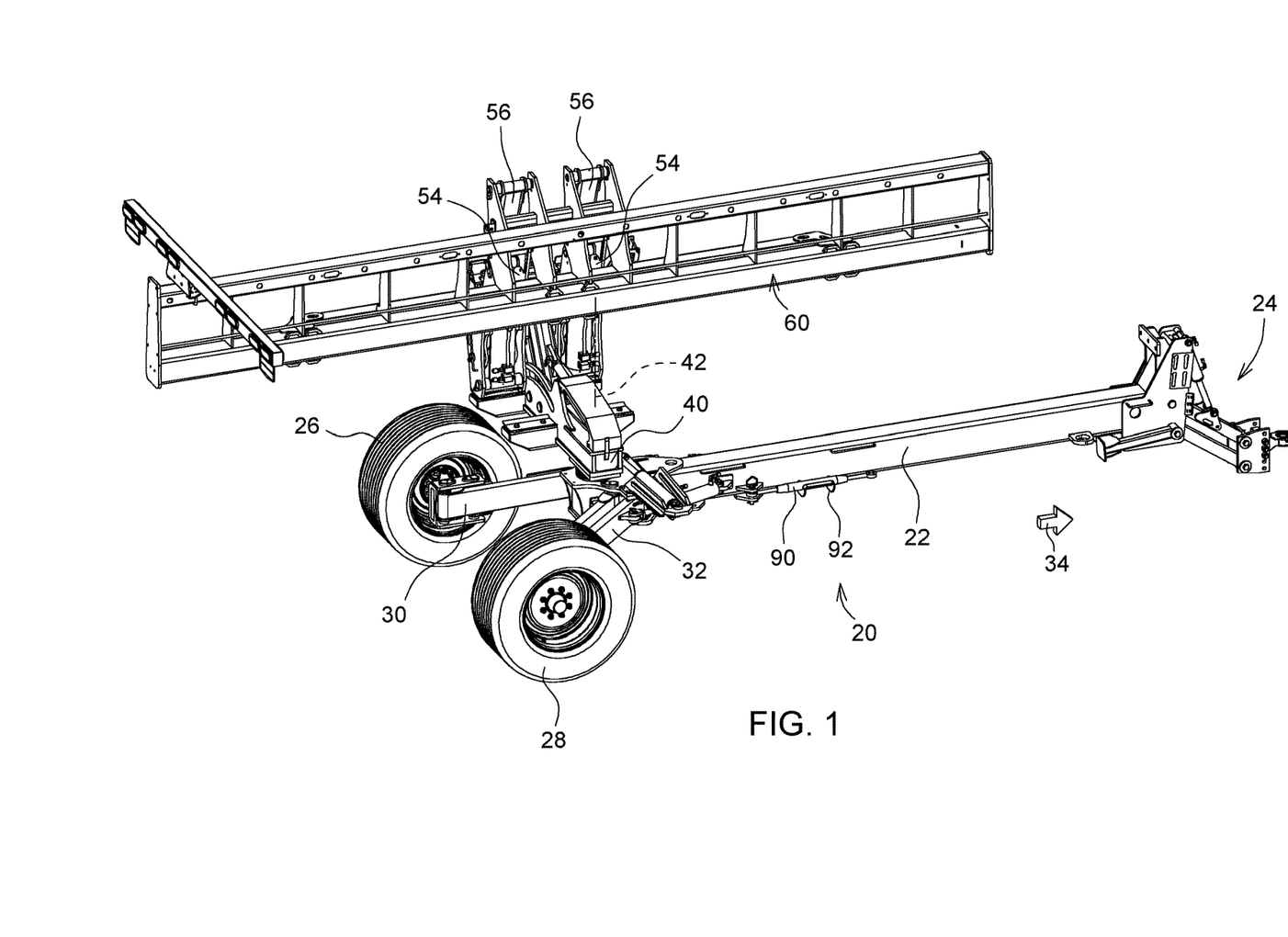
FIG. 1 is a perspective view of an implement frame with the frame in a transport position or orientation.

Implement frame 20 further includes a pivot frame 40 mounted to the carriage frame 22 for rotation about a generally upright axis 42. A lift assembly 50 is in turn coupled to the pivot frame 40, and a tool bar 60 is connected to the lift assembly 50. The implement frame is designed to enable movement of the tool bar between a transport position and a field use position. The transport position is shown in FIG. 1 in which the length of the tool bar 60 is oriented longitudinally with respect to the carriage frame and the direction of forward travel. The pivot frame 40 and lift assembly 50 are used to move the tool bar from the fore and aft extending transport position of FIG. 1 to a transversely extending use position. As will be described in detail below, the lift assembly 50 is coupled to the pivot frame through a shift assembly 70 that moves the lift assembly, and thereby the tool bar, radially relative to the axis 42. Shifting of the tool bar more evenly centers the tool bar and the tools mounted thereon (not shown) relative to the carriage frame 22 and wheels 26 and 28.

Figure 2:
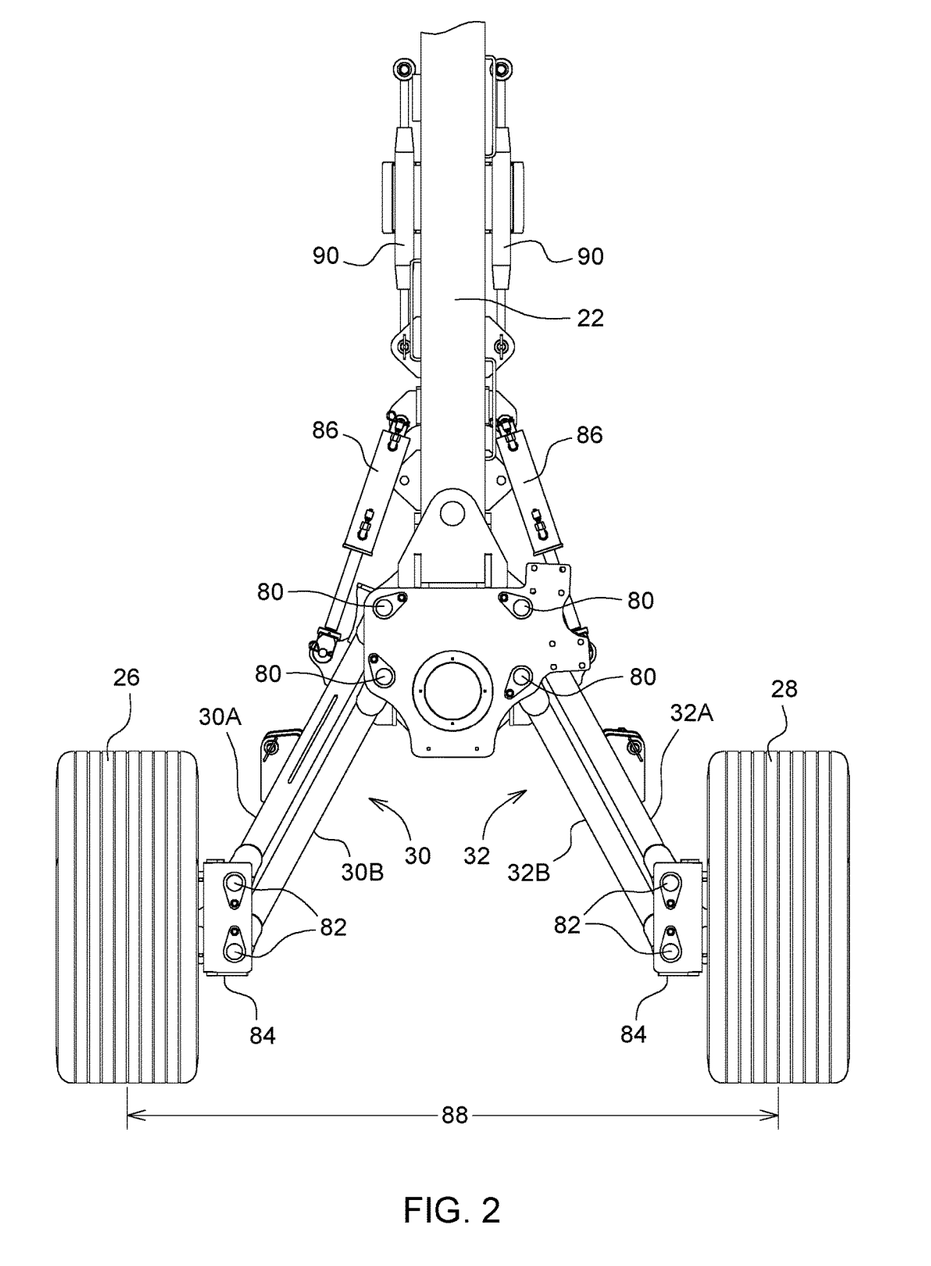
FIG. 2 is a plan view of a rear portion of the implement frame of FIG. 1 illustrating the wheels and swing arms in the transport position.
Figure 3:
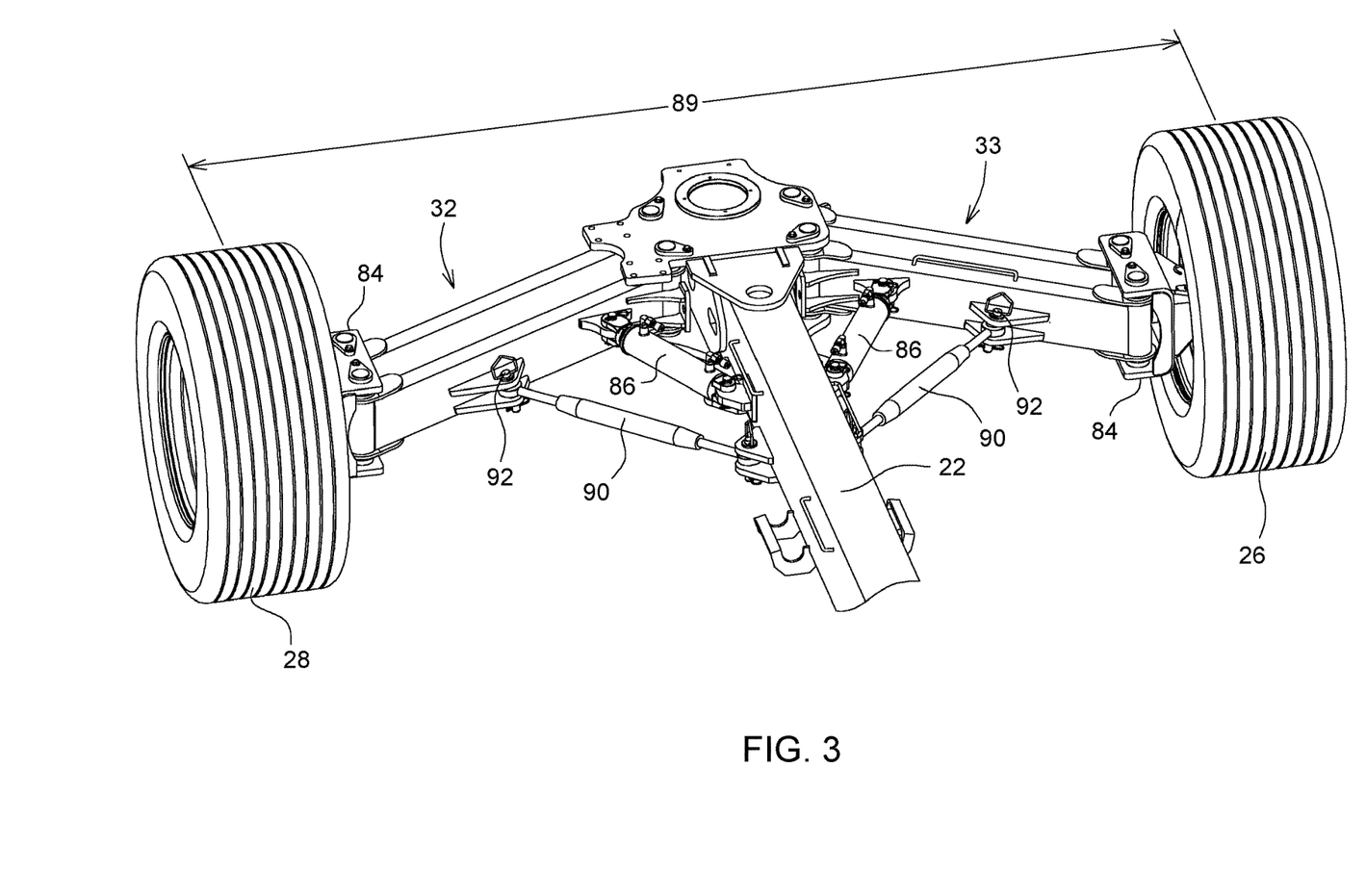
FIG. 3 is a perspective view of the rear portion of the implement frame shown in FIG. 2 with the wheels and swing arms in the field use position.

With reference to FIGS. 2 and 3, the wheels and swing arms 30 and 32 are shown in greater detail. The swing arms are each formed of two bars 30A and 30B and 32A and 32B. Each bar is pivotally coupled to the carriage frame at pivot joints 80. At the opposite ends, each arm is pivotally coupled to a wheel hub bracket 84 by pivot joints 82. Wheel hubs, not shown, are mounted to the brackets 84 and the wheels are mounted to the hubs in a conventional manner. The position of the swing arms 30 and 32 is controlled by actuators, shown as hydraulic cylinders 86. Other types of actuators may be used if desired. The cylinders 86 are coupled at their cap ends to the carriage frame and the rod ends are coupled to the swing arms. As shown in FIG. 2, the swing arms are rotated rearward relative to the carriage frame to a transport position in which the track width 88, measured as the distance between to center lines of the two wheels, is reduced for a narrower transport track width. The bars 30A/30B and 32A/32B are configured as a parallel linkage to maintain the wheel hubs in a fixed attitude with the wheels aligned with the forward travel direction 34.

In FIG. 3, the rods of the cylinders 86 have been retracted to bring the swing arms forward, moving the wheels outward to a position of increased track width 89. This wider track width position provides greater stability for the implement when the tool bar is in the field use position. In the field use position, struts 90 are coupled between the carriage frame 22 and the swing arms to hold the swing arms in position without reliance on hydraulic pressure. The struts 90 are coupled to the swing arms by removable pins 92. The struts may be in the form of turn buckles that are adjustable in length to enable the field use track width to be set based on the spacing of tools on the tool bar so that the wheels may track between tools. During transport, the struts 90 are pivoted forwardly, along the side of the carriage frame, and held in brackets 94 (FIG. 1).

Figure 4:
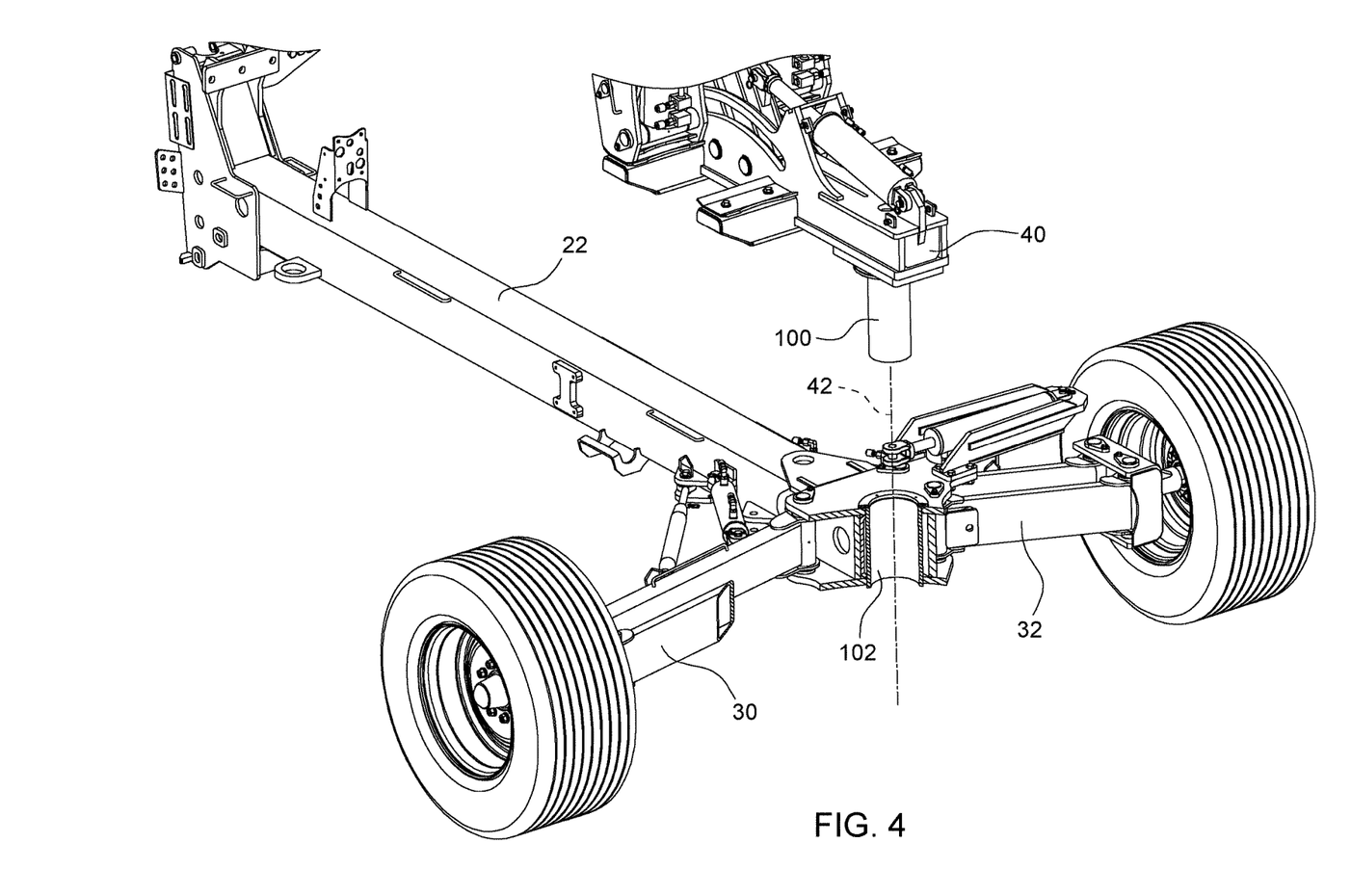
FIG. 4 is an exploded perspective view illustrating the attachment of the pivot frame to the carriage frame for rotation about a pivot.

The pivotal coupling of the pivot frame 40 to the carriage frame 22 is shown in FIG. 4. The pivot frame 40 includes a post 100 received in sleeve 102 of the carriage frame with appropriate bearings and/or bushings (not shown) as needed to allow the pivot frame 40 to rotate about the axis 42. An actuator, shown as a hydraulic cylinder 104, is mounted to a bracket 106 on the carriage frame and to the pivot frame 40 at joint 108, a distance from the axis 42. Extension and retraction of the rod of cylinder rotates the pivot frame relative to the carriage frame. See FIG. 5.

Figure 5:
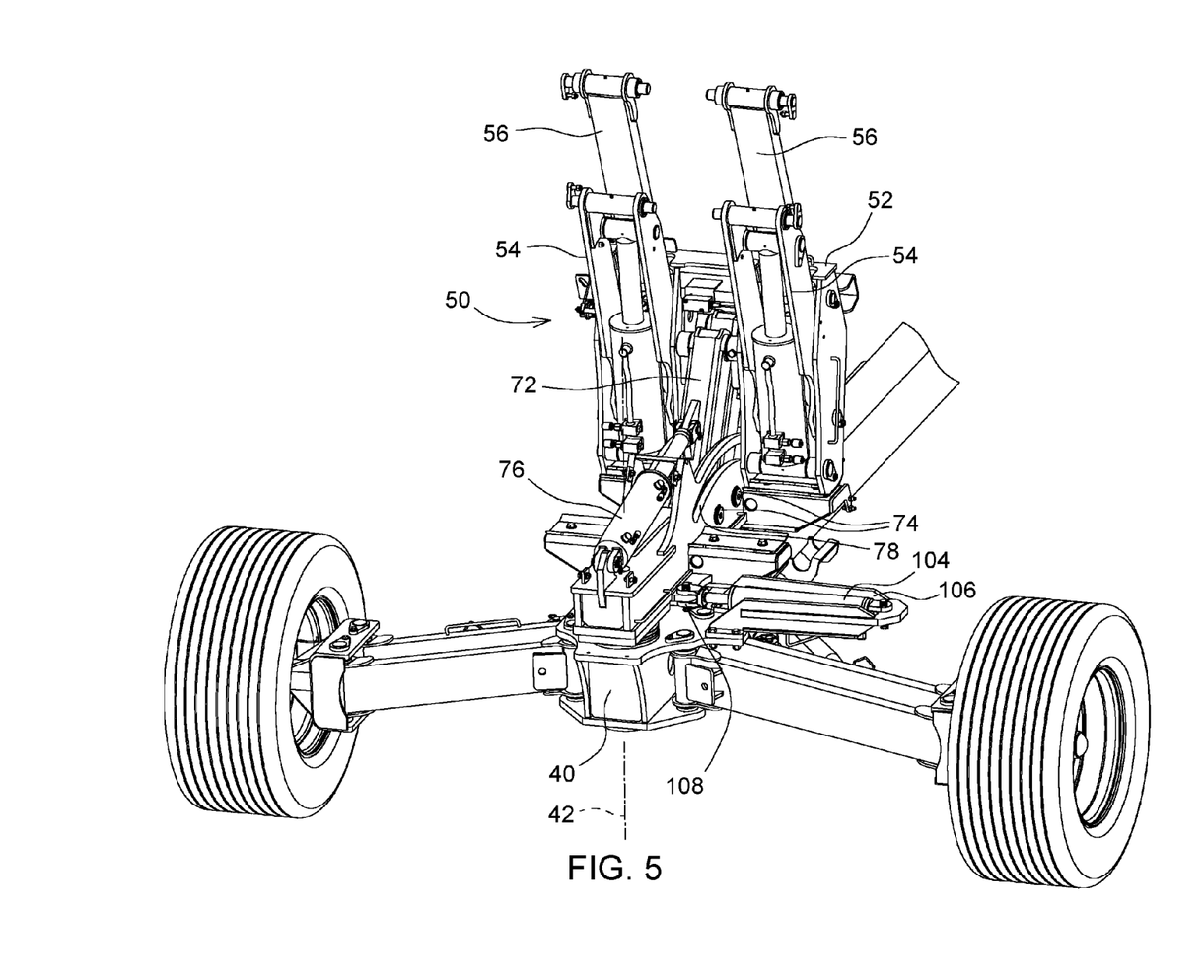
FIG. 5 is a perspective view of the implement frame of FIG. 1 with the lift assembly in the forwardly shifted position prior to rotation of the pivot frame.
Figure 6:
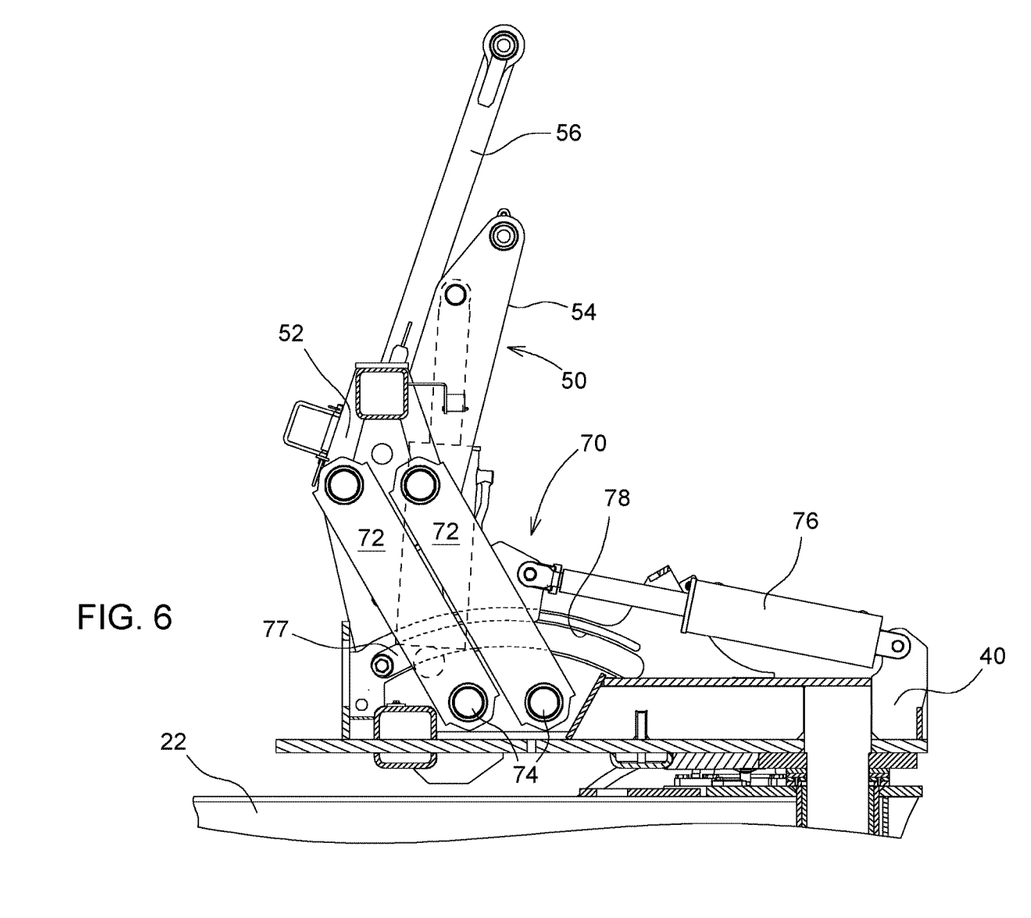
FIG. 6 is a cut away side view of the implement frame illustrating the shift assembly.

With reference to FIGS. 5 and 6, the mounting of the lift assembly 50 to the pivot frame 40 via the shift assembly 70 is shown in detail. The lift assembly 50 includes a lift frame 52 to which lower lift arms 54 and upper lift arms 56 are pivotally mounted. The shift assembly 70 includes a pair of shift arms 72 pivotally coupled at one end to the pivot frame 40 at joints 74. An actuator in the form of a hydraulic cylinder 76 extends between the pivot frame 40 and one of the shift arms 72. The shift arms 72, together with the pivot frame 40 and lift frame 52 form a parallel linkage to maintain the lift frame 52 in a fixed attitude while moving with the shift arms. In addition, the shift assembly 70 includes a follower 77 which is captured and slides within a slot 78 in the pivot frame to further stabilize the lift frame 52.

The lift arms 54 and 56 are coupled at the opposite ends to the tool bar to support the tool bar on the implement frame. Actuators, in the form of hydraulic cylinders 58, are coupled between the lift frame52 and the lower lift arms 54. Extension and retraction of the rods of the cylinders 58 raises and lowers the lift arms. The lift arms, the lift frame 52 and the tool bar 60 form a parallel linkage to keep the tool bar in a fixed attitude between positions.

Figure 7:
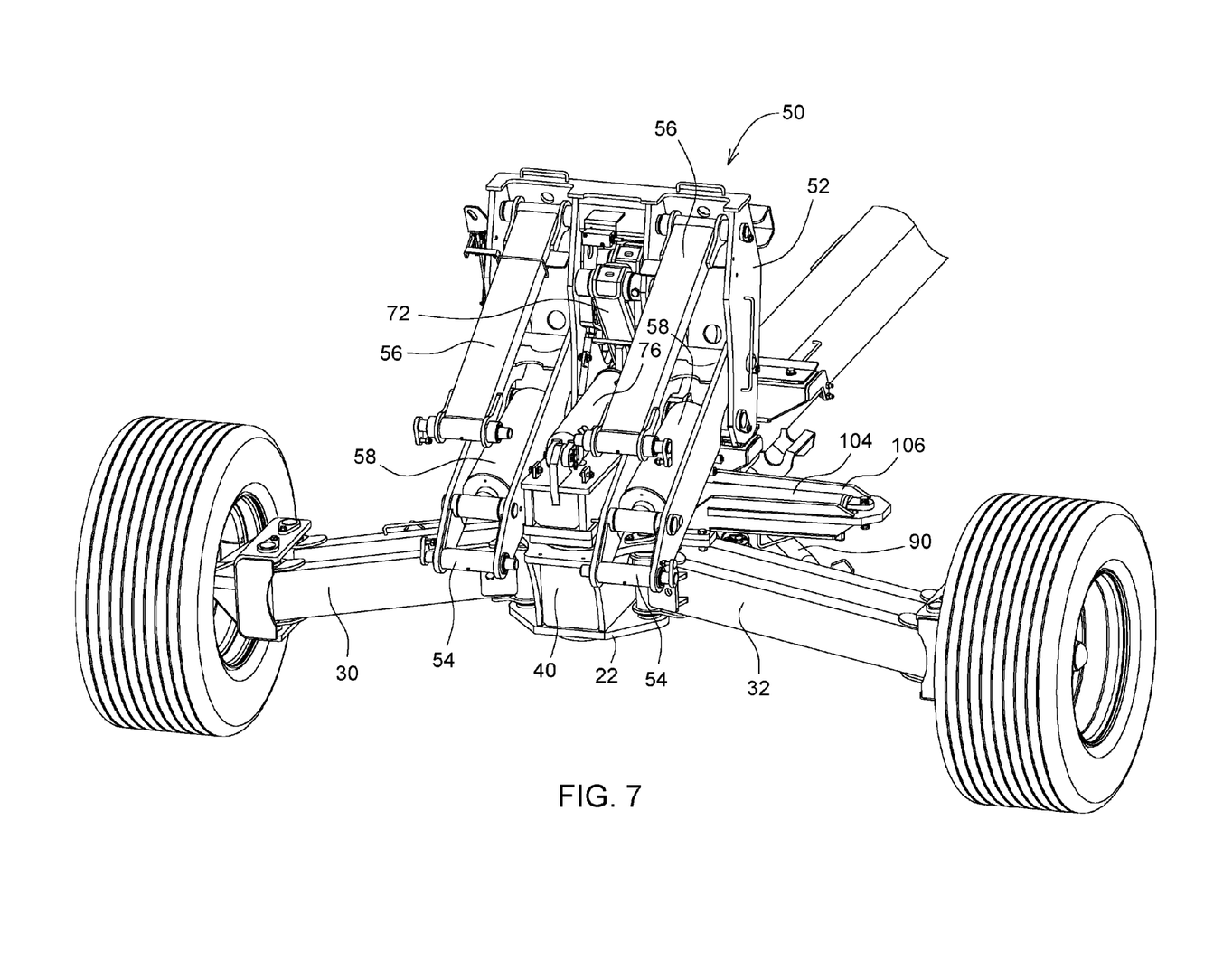
FIG. 7 is a rear perspective view of the implement frame of FIG. 1 in the field use position.
Figure 8:
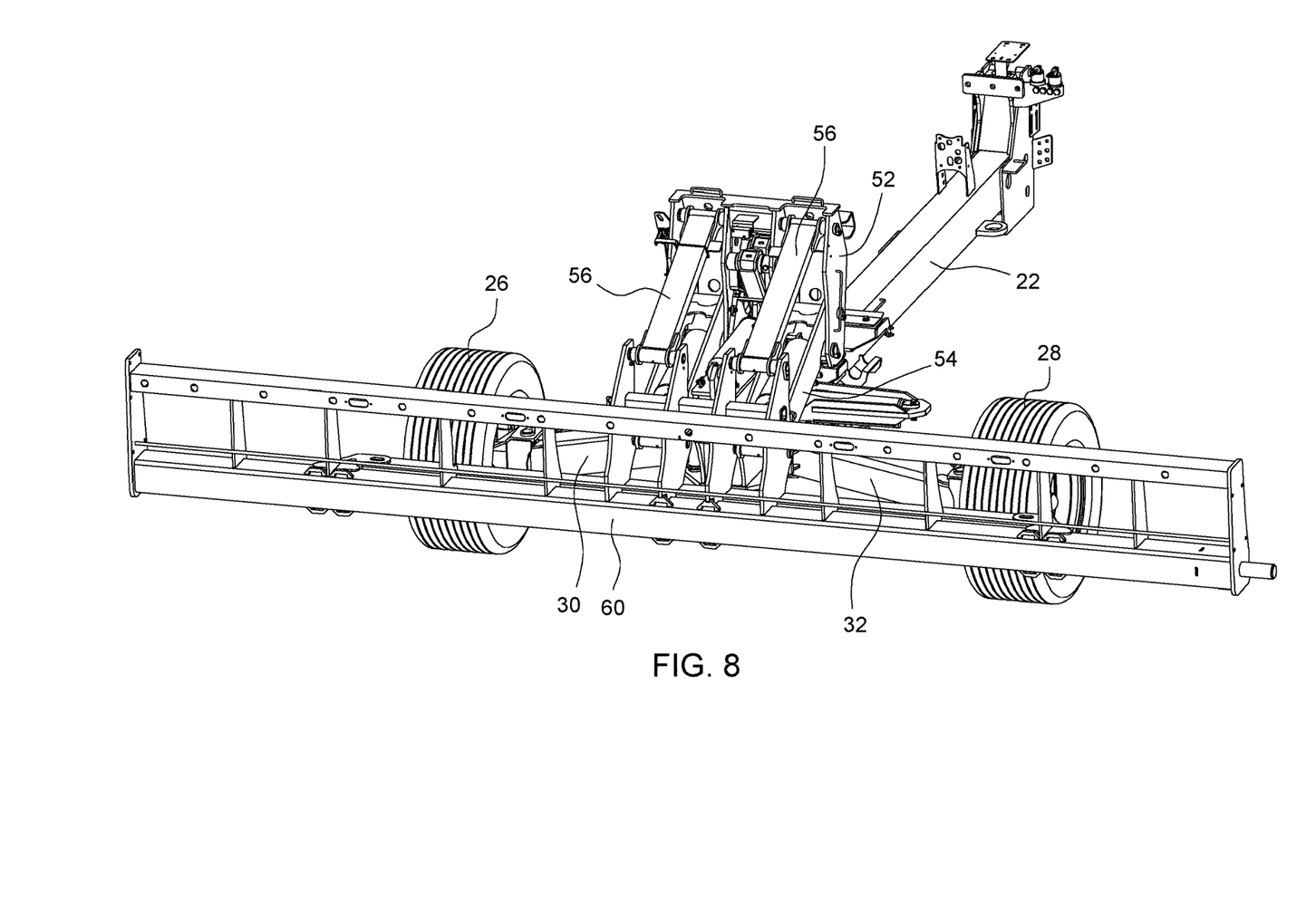
FIG. 8 is a rear perspective view showing the implement frame of FIG. 1 with the tool bar in the field use position.

The implement frame is shown in the field use position in FIGS. 7 and 8. The pivot frame is rotated to the position where the tool bar, not shown, extends transversely to the direction of travel. The shift assembly is in the rearward position and the lift arms 54 and 56 are in the lowered position. The swing arms 30 and 32 are rotated forwardly to increase the track width and to locate the wheels forward of the tool bar so that the tires do not travel over worked soil.

To transition from field use to transport, first, the lift arms are raised by extending the rod of cylinders 58. Next, the shift arms are moved forward by extending the rod of cylinder 76. This moves the tool bar forward. Following the shift, the pivot frame 40 is rotated approximately ninety degrees to rotate the tool bar from a transversely extending orientation to a longitudinally extending orientation. Lastly, the struts 90 are decoupled from the swing arms 30 and 32 and the swing arms are moved rearward by extension of the rods in cylinders 86. This decreases the track width for narrower transport. Transitioning back to the field use position is accomplished by reversing the above steps. The entire operation of moving from field use to transport and back again, is accomplished by automated means; the use of actuators, such as hydraulic cylinders, except for the coupling and decoupling of the struts 90. Throughout the entire process, the tool bar is maintained in a fixed attitude such that there is no spillage or leakage of seed or chemicals from planter or application tools mounted to the tool bar. The result is an implement frame that can be quickly and easily transitioned between field use and transport positions. As those knowledgeable in implement frames will appreciate, the variable track width feature can be used with other types of lift and pivot mechanisms or other folding frame mechanisms to reduce transport width.

Having described the preferred embodiment, it will become apparent that various modifications can be made without departing from the scope of the invention as defined in the accompanying claims.

What is claimed is:

1. An implement frame assembly comprising:
   a carriage frame having a tongue for coupling to a hitch of a towing vehicle and wheels supporting the carriage frame for movement over a ground surface;
   a pivot frame mounted to the carriage frame for rotation about an axis approximately ninety degrees;
   a lift assembly coupled to the pivot frame by a shift assembly, the shift assembly moving the lift assembly radially relative to the axis; and
   a tool bar connected to the lift assembly for movement between a lower ground engaging position and a raised position.

2. The implement frame of claim 1 wherein the lift assembly includes a lift frame mounted to the pivot frame by a shift arm and an actuator coupled to the pivot frame and the shift arm for moving the shift arm about a pivot.

3. The implement frame of claim 2 further comprising a guide slot in the pivot frame and a follower mounted to the lift frame of the lift assembly for guided movement of the lift assembly as the lift assembly is shifted upon operation of the actuator.

4. The implement frame of claim 2 comprising a pair of shift arms whereby the shift arms, the pivot frame and the lift frame of the lift assembly form a parallel linkage.

5. The implement frame of claim 4 further comprising a guide slot in the pivot frame and a follower mounted to the lift frame of the lift assembly for guided movement of the lift assembly as the lift assembly is shifted upon operation of the actuator.

6. The implement frame of claim 1 wherein the lift assembly includes a lift frame and upper and lower lift arms pivotally coupled to the lift frame and the toolbar whereby the lift frame, the tool bar and the upper and lower lift arms form a parallel linkage.

7. The implement frame of claim 6 further comprising a pair of upper and lower lift arms coupled to the lift frame and the toolbar.

8. The implement frame of claim 1 wherein the wheels are mounted to the carriage frame by a pair of swing arms pivotally coupled to the carriage frame to selectively vary the track width between a wider field track width and a narrower transport track width by movement of the swing arms.

9. The implement frame of claim 8 further comprising an actuator extending between the carriage frame and each swing arm to move the swing arms relative to the carriage frame.

* * * * *

UNITED STATES PATENT AND TRADEMARK OFFICE
CERTIFICATE OF CORRECTION

PATENT NO. : 10,172,276 B2
APPLICATION NO. : 15/184238
DATED : January 8, 2019
INVENTOR(S) : James R. Peterson

Page 1 of 1

It is certified that error appears in the above-identified patent and that said Letters Patent is hereby corrected as shown below:

On the Title Page

Item [73], Change "DEER & COMPANY" to --DEERE & COMPANY--.

Signed and Sealed this
Eighteenth Day of June, 2019

Andrei Iancu
*Director of the United States Patent and Trademark Office*